(12) United States Patent
Howell (10) Patent No.: US 10,499,754 B2
(45) Date of Patent: Dec. 10, 2019

(54) SENSING DEVICE FOR SHOPPING CART

(71) Applicant: Walmart Apollo, LLC, Bentonville, AR (US)

(72) Inventor: Daniel Howell, Bentonville, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 44 days.

(21) Appl. No.: 15/685,015

(22) Filed: Aug. 24, 2017

(65) Prior Publication Data
US 2018/0078058 A1    Mar. 22, 2018

Related U.S. Application Data

(60) Provisional application No. 62/397,445, filed on Sep. 21, 2016.

(51) Int. Cl.
*A47F 10/02* (2006.01)
*G01C 21/20* (2006.01)
*G06Q 10/08* (2012.01)

(52) U.S. Cl.
CPC ............ *A47F 10/02* (2013.01); *G01C 21/206* (2013.01); *G06Q 10/087* (2013.01)

(58) Field of Classification Search
CPC ...... G01C 21/206; G01C 21/00; G01C 21/20; A47F 10/04; A47F 10/02; G06Q 30/00; H04W 4/02
USPC ......................................................... 701/409
See application file for complete search history.

(56) References Cited

U.S. PATENT DOCUMENTS

| | | |
|---|---|---|
| 7,147,154 B2 | 12/2006 | Myers et al. |
| 7,339,469 B2 | 3/2008 | Braun |
| 7,672,876 B2 | 3/2010 | Bonner et al. |
| 8,660,581 B2 | 2/2014 | Davis et al. |
| 8,955,870 B2 | 2/2015 | Lee et al. |
| 9,243,918 B2 | 1/2016 | Goldman et al. |
| 2007/0008068 A1 | 1/2007 | Brice et al. |
| 2008/0153540 A1 | 6/2008 | Brown |
| 2012/0143495 A1 | 6/2012 | Dantu |
| 2014/0236653 A1 | 8/2014 | Farrell |
| 2015/0206121 A1 | 7/2015 | Joseph et al. |
| 2016/0255969 A1 | 9/2016 | High et al. |
| 2016/0260049 A1 | 9/2016 | High et al. |
| 2016/0269860 A1 | 9/2016 | Weizman et al. |

FOREIGN PATENT DOCUMENTS

WO    2016018895 A1    2/2016

OTHER PUBLICATIONS

International Search Report & Written Opinion in International Patent Application No. PCT/US17/48309, dated Nov. 6, 2017; 13 pages.

(Continued)

*Primary Examiner* — Anthony R Jimenez
(74) *Attorney, Agent, or Firm* — Schmeiser, Olsen & Watts LLP; Timothy P. Collins (57) ABSTRACT

A sensing device is paired with a shopping cart for assisting an operator of the shopping cart, and comprises a sensor unit that receives and processes telemetry data received from a context source; a processor that reads the telemetry data from the sensor unit; and a transmitter that wirelessly transmits the read telemetry data directly from the sensing device to a mobile computing device. The read telemetry data is processed by the mobile computing device to perform a navigation operation.

19 Claims, 4 Drawing Sheets

(56) References Cited

OTHER PUBLICATIONS

Samer Hodroj, "The Smart Shopping Cart," YouTube.com, Jun. 11, 2016.
Sales, et al., "CompaRob: The Shopping Cart Assistance Robot," Sage Journals, vol. 12 issue: 2, Feb. 1, 2016. https://journals.sagepub.com/doi/full/10.1155/2016/4781280.
International Preliminary Report on Patentability in PCT/US2017/048309 dated Apr. 4, 2019; 12 pages.
"Smart shopping cart by SK telecom," May 28, 2019, DesignBoom.com/technology/smart-shopping-cart-by-sk-telecom/.
Modern Expo Group, "Smart Shopping Cart by Modern-Expo," Mar. 6, 2017, YouTube.com, Video.
"Smartcart Oy" Mar. 5, 2015, Facebook.com/smartcart.fi.
Caper, Inc. "Autonomous Checkout with Smart Carts," May 28, 2019, Caper.ai.

FIG. 2

SENSING DEVICE FOR SHOPPING CART

RELATED APPLICATIONS

This application claims the benefit of U.S. Provisional Patent Application No. 62/397,445, filed Sep. 21, 2016, entitled "Sensing Device for Shopping Cart," the contents of which are incorporated by reference herein in their entirety.

TECHNICAL FIELD

The present inventive concepts relate to retail systems, and more specifically, to the use of shopping carts for navigating a user in a store or other operation relying on context-related content.

BACKGROUND

A shopper in a modern retail store typically gathers items for purchase and places them in a shopping cart or basket as the shopper moves about the store. However, the continued modernization of retail stores permits a larger variety of items to be available for purchase. The size of large retail stores, such as superstores, makes it difficult for a shopper to locate certain items. Also, modernized stores have installed electronic displays, shelf labels, kiosks, and the like for presenting useful information to a shopper in order to improve the shopping experience, with a goal that the shopper will spend more time at the store and purchase more items.

SUMMARY

In one aspect, provided is a sensing device paired with a shopping cart for assisting an operator of the shopping cart, comprising: a sensor unit that receives and processes telemetry data received from a context source; a processor that reads the telemetry data from the sensor unit; and a transmitter that wirelessly transmits the read telemetry data directly from the sensing device to a mobile computing device, wherein the read telemetry data is processed by the mobile computing device to perform a navigation operation.

In another aspect, provided is a shopper assistance system, comprising: a mobile computing device application; and a peripheral device attached to a shopping cart. The peripheral device comprises a sensor unit that receives and processes one or more environmental input data; a processor that reads the environmental input data from the sensor unit; a transmitter that wirelessly transmits the read environmental input data to the mobile computing device application, wherein the read environmental input data is processed by the mobile computing device application to perform a navigation operation.

In another aspect, a method of navigation in a store comprises collecting telemetry data from one or more sensors in the store by a peripheral device attached to a shopping cart; and wirelessly transmitting, with a transmitter of the peripheral device, the collected telemetry data to a mobile computing device configured to use the telemetry to perform a navigation operation.

DETAILED DESCRIPTION OF EMBODIMENTS

Figure 1:
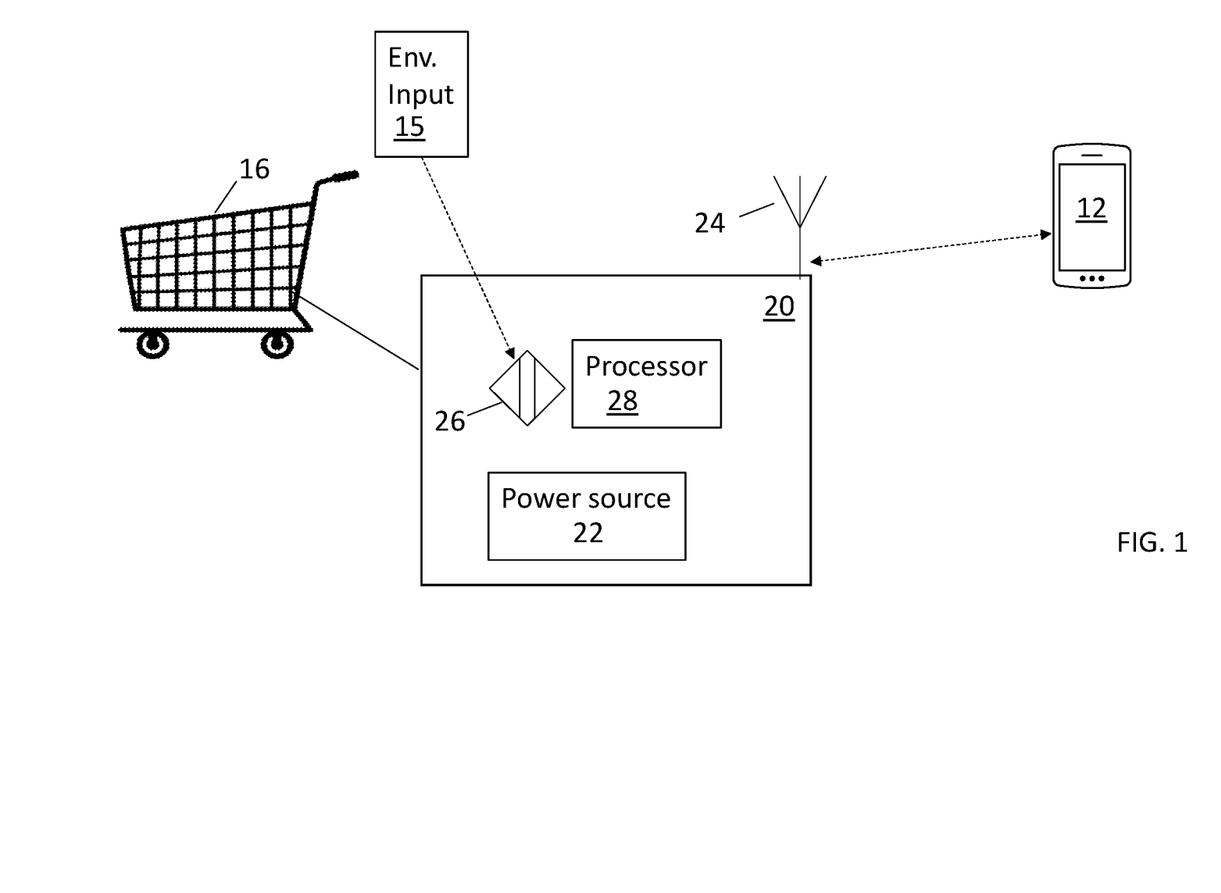
FIG. 1 is a diagram of elements of a shopper assistance system in which embodiments of the present inventive concepts may be practiced.

FIG. 1 is a diagram of elements of a shopper assistance system in which embodiments of the present inventive concepts may be practiced.

The shopping assistance system may include a mobile computing device 12 and a peripheral device 20 coupled to a shopping cart 16. The mobile computing device 12 may be used by a shopper, a store associate, and/or other participant in a retail environment.

Although a shopping cart 16 is shown and described, another shopping apparatus having a container therein may equally apply, such as a shopping basket, utility cart, pallet jack, and the like.

In some embodiments, the peripheral device 20 may be attached to a portion of the shopping cart 16, such as the handle, through an attachment means such as an adhesive, a fastener, a magnet, a clip and the like. In some embodiments, the peripheral device 20 may be detachably or removably attached to the shopping cart 16. Here, the user, e.g., shopper or store associate, may stow the device 20 in a pocket, holster, or other reachable location. For example, the minimal sensors of the shopping cart may detect a change in context and deliver the resulting data to a software application stored at and executed by the mobile computing device 12. In some embodiments, the peripheral device 20 is integrated with the structure of the shopping cart 16. For example, the peripheral device 20 may be permanently imbedded on the rim, frame, or handle of the cart 16. In other embodiments, the peripheral device 20 may be positioned on an object that permits the peripheral device 20 to function as a proxy device between a mobile computing device 12 and a context-producing element of a retail environment. Data produced therefrom can be output to a remote computer, for example, for processing and subsequent review and analysis by an analyst or other interested party.

The sensor 20 is constructed and arranged to facilitate an exchange of electronic data between one or more environmental inputs 15, for example, a context source, and the mobile computing device 12. The mobile computing device 12 may lack various physical and/or functional features that prevents the device 12 from performing a shopping-related function, for example, navigating through the store, communicating with a point of sale (POS system), scanning a near field communications (NFC) tag on an item or retail fixture of interest, build a list of shopping items for example described in International Publication No. WO 2016/018895 filed Jul. 28, 2015, entitled "Apparatus and Method for Building a Shopping List with a Sensor Unit," incorporated by reference herein in its entirety, and so on. The peripheral device 20 is constructed and arranged to act on behalf of the mobile computing device 12 to gather telemetry data, for example, from active and/or passive store sensor sources, and to convey the telemetry data to the mobile computing device 12 for processing, and for performing functions on a smartphone or other mobile computing device 12 that would otherwise not be possible on its own or with reliance on store servers or an expensive infrastructure. Thus, in some embodiments, store sensors are not required.

For example, in shopping environments where it is desirable to know a current location of the shopping cart 16, the shopping cart 16 communicates directly with the mobile computing device 12 by providing data received from store sensors to the mobile computing device 12, and the mobile computing device 12 uses the received telemetry data to perform a navigation-related calculation, and to determine the location. For example, telemetry data is delivered directly from the shopping cart 16 to the remote mobile computing device 12 for performing navigation operations from a processor of the mobile computing device 12. The proxy function may be performed by the shopping cart peripheral device 20 between a stationary context source at a predetermined store location and the mobile computing device 12, which simplifies a navigation operation rather than a complex computing or location-finding environment for determining a shopping cart's location.

To perform the foregoing, the peripheral device 20 may include a power source 22, transmitter 24, sensor unit 26, and processor 28. The peripheral device 20 may be constructed as a standalone unit, where the power source 22, transmitter 24, sensor unit 26, and processor 28 coexist in a common housing, which in turn is coupled to a shopping cart 16, or other container such as a basket, bin, bag, and the like. For example, the peripheral device 20 may include a housing that includes the power source 22, transmitter 24, sensor unit 26, and processor 28, and is configured for coupling to a handle or frame of the shopping cart 16.

The power source 22 is constructed and arranged to provide power to the other electronic components of the peripheral device 20, including but not limited to transmitter 24, sensor unit 26, and processor 28. The power source 22 may include a battery, kinetic capacitor, solar device, and so on.

The transmitter 24 may include an antenna or other transmit/receive device, and may implement a well-known or proprietary short-range wireless technology such as BLE, Bluetooth, Near Field Communication (NFC), radio, audio, video, laser, imaging, infra-red, and so on for establishing a wireless communication, or pairing, with the mobile computing device 12. The transmitter 24 can therefore wirelessly transmit environmental input data, for example, telemetry data or the like, to the mobile computing device 12 for processing.

The sensor unit 26 is constructed and arranged to receive and process data from an environmental input 15, for example, a context source. In some embodiments, the sensor unit 26 includes a telemetry device that collects telemetry or other measurement data, which is transmitted via the transmitter 24 to the mobile computing device 12 for navigation purposes.

For example, the sensor unit 26 can sense signals transmitted from transponders such as an RFID tag. The sensor unit 26 may communicate with an environmental input 15 by one or more of the following technologies, but not limited thereto: GPS, light sensor, BLE, Wi-Fi, laser, accelerometer, odometer (perambulator), digital compass, camera, infrared, thermometer, or a combination thereof. Other sensor elements may include a bar code scanner, Quick Response (QR) code reader, optical scanner, radio frequency identification (RFID) reader, near field communication (NFC) reader, lower energy Bluetooth (BTLE) reader, and the like.

The processor 28 is constructed and arranged to read and process data from the sensor unit 26, and facilitates the output of the data via the transmitter 24 to the mobile computing device 12 to perform an operation, for example, navigation-related calculation, and to determine the location. The processor may include special-purpose microprocessors, software, or a combination thereof for interpreting a signal read by the sensor unit 26 to convert the signal into data to be transmitted via the transmitter 24. For example, the sensor unit 26 may read a bar code which is interpreted by the processor 28 into a UPC or the like to be transmitted. In some embodiments, the processor 28 includes a memory device for temporarily storing data exchanged between environmental inputs 15 and the mobile computing device 12.

In some embodiments, the sensor unit 26 and processor 28 may act as a proxy for an application executed at the mobile computing device 12 when the mobile computing device 12 does not have a particular capability. For example, the mobile computing device 12 may not include an NFC feature, but the shopping cart 16 configured with the NFC-enabled sensor unit 26 may attach to the mobile computing device 12 via an existing wireless pairing technology and perform a function that would otherwise be lacking at the mobile computing device 12 on its own. Thus, a store computer is not required to determine a location of the shopping cart 16.

The mobile computing device 12 may be any processor-based device used by the shopper to process telemetry data. For example, the mobile computing device 12 may be a smartphone, a tablet computer, a wearable computer device, and the like. In general, the mobile computing device 12 includes a processor, a memory storage device, and one or more input and output devices such as a touch screen. The mobile computing device 12 includes a receiver for receiving signal from the transmitter 24 of the peripheral device 20. The mobile computing device 12 further includes a network interface such as a WiFi transceiver or mobile data transceiver for communicating with a network (not shown). The mobile computing device 12 may have a shopping application 50 installed on in its memory and executed by its processor. The shopping application may process the telemetry data to perform a function, such as navigating the shopper to an item of interest.

Figure 2:
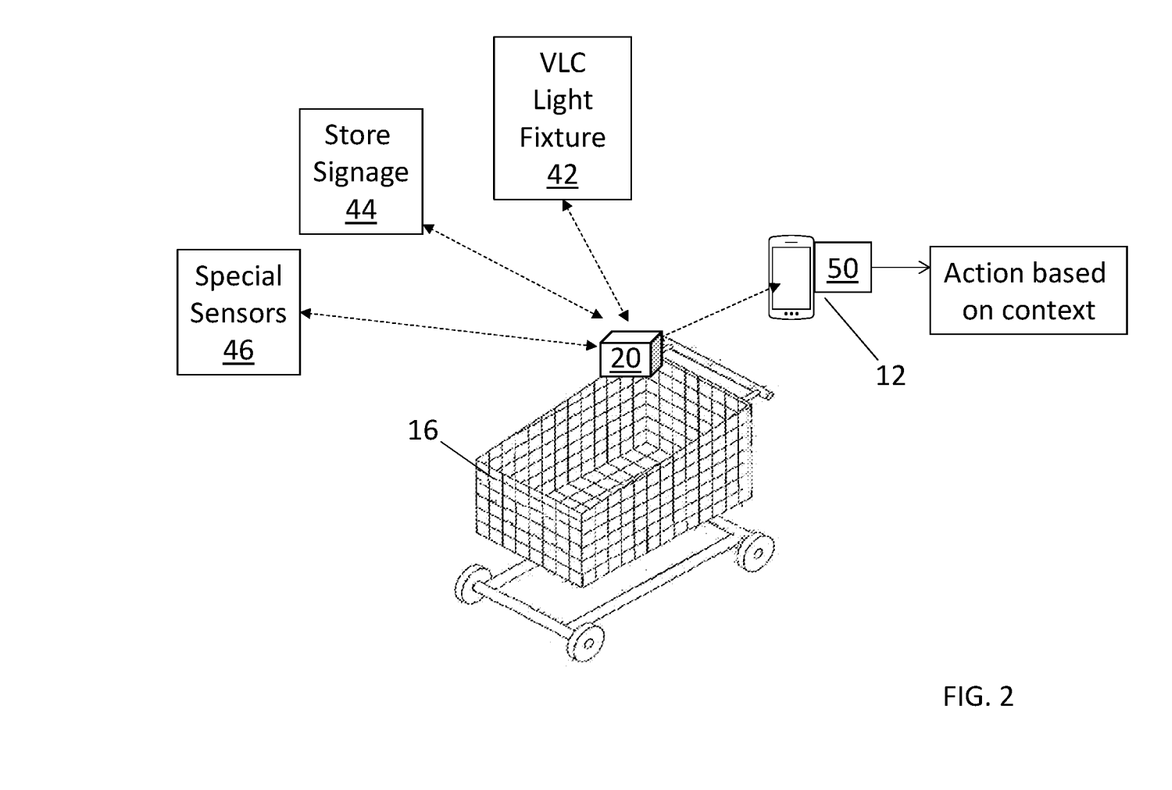
FIG. 2 is a diagram of an environment in which a shopper assistance system may operate.

FIG. 2 is a diagram of an environment in which a shopper assistance system may operate. For example, the environment may include one or more of the mobile computing device 12, peripheral device 20, and shopping cart 16 of FIG. 1.

The peripheral device 20 at the shopping cart 16 may detect a light fixture 42, for example, a Visual Light Communication (VLC) light fixture or other visible light wireless communication technology, that provides a signal, for example, a unique identifier, to the peripheral device 20. It is well-known that VLC, sometimes also referred to as "LiFi", may use standard off-the-shelf visible light LEDs to transmit data using the visible light spectrum.

For example, an LED light fixture may be equipped with a computer processor, for example, a computer chip, that causes the light to blink at a humanly imperceptible rate, but may be sensed by an electronic device, for example, interpreted by a digital camera. Here, a determined "blink rate" can be associated to a list of locations, and the mobile computing device, or more specifically, the device's camera, can process this received information, i.e., at the sensed rate, and look up the associated location on a stored list to return to the application 50.

The signal comprising identifier data or the like may be received by the sensor unit 26, which in response outputs a telemetry result to the mobile computing device 12 that in response performs a navigation calculation to determine the shopper's location in the store.

A VLC light fixture may provide telemetry data to the sensor unit 26 where the light is emitted in a predetermined pattern, for example, blinking on and off corresponding to a binary format (1s and 0s), similar to Morse code, to the device camera or related sensor. In another example, no data is transmitted except for a particular frequency or pattern that is associated with a stored list of actions or locations associated with that pattern. For example, the mobile device application 50 may process signals received via device sensors such as a camera that a light blinks at a particular rate, whereby the application 50 generates in response a command to perform a function or activity in response to the detected rate. Accordingly, a sensor may receive packets of information via on/off blinking, or receive a repeating pattern that is pre-associated to a specific action.

Also, the application 50 may store a list of the locations of lights and their accompanying "blink rates." This permits the mobile computing device 12 to monitor for a new light that is along the navigation path, and to sense the light when comes into its view, so that it can update the location position that the application 50 is displaying to the customer.

In other embodiments, the application 50 executed on the mobile computing device 12 can use the shopping cart 16 as a remote camera by use of the sensor unit 26. For example, the mobile computing device 12 can provide audio or visual navigation aids, for example, audio turn-by-turn prompts or the like by interpreting the incoming telemetry result from the peripheral device 20. In other embodiments, the cart device may provide audio and/or visual navigation aids, allowing the mobile computing device 12 to remain out of view, for example, in the user's pocket, but allowing data communications to be exchanged due to pairing between the mobile computing device 12 and the cart device having at least one sensor for processing environmental inputs or the like.

For example, a shopper may recognize a particular light, for example, according to its color, brightness, or other characteristic. The location of the light may appear on an electronic map displayed on the shopper's mobile device 12. Based on the known light location on a store floor, navigation information such as a displayed line of the shopper's current location relative to the light location may be generated. Also, other telemetry inputs may be received and processed that may be used to guide the shopper via displayed information regarding other locations of interest at the store. Thus, the only elements required to perform navigation in this manner are the VLC light fixture 42, peripheral device 20, and paired mobile computing device 12.

Also, the mobile computing device 12 may remain in the user's pocket while still serving as a navigation aid. Typically, line of sight is required between a smartphone's camera or other sensor and an object of interest, for example, the abovementioned VLC light fixture, in order for the camera to sense the light output from the light fixture. However, if the phone camera cannot sense emitted light, then camera cannot receive and process information provided by the light used for navigation purposes. However, in some embodiments, the mobile computing device 12 may be covered or obscured so its camera cannot receive and process light signals. However, navigation may nevertheless be performed since a peripheral camera of the sensor unit 26 on the shopping cart 26 may function as a proxy device, and communicate sensed information to the mobile electronic device via a different transmission path, thereby obviating the need for line of sight between the mobile computing device 16 and the light source.

In some embodiments, the sensor unit 26 may detect a watermarked or other coded signage 44 that may prompt an action executed in response to the mobile device application. For example, the sensor unit 26 may include a camera on the shopping cart 16, which may identify from a store signage 44 if the shopping cart 16 is in a checkout lane, a customer service lane, and so on. For example, a digital camera of the sensor unit 26 may recognize symbology markings or other patterns otherwise not recognizable by the human eye, but nevertheless providing data that results in an action when processed. These markings may be embedded on objects such as posters, floor graphics, physical signs hanging from fixtures, shelves, and so on. This may prompt the application 50 executed at the mobile computing device 12 to prepare for actions relative to a shopping experience. Referring to the previous example, a store sign may visually welcome a customer to a 'Checkout Area' while an imperceptible watermark may include a reference to a camera on a cart (not necessarily visible to the customer) which can be provided to the mobile device application 50 to prepare the customer to proceed to a particular lane in the Checkout Area. Another action could be that a shopping cart 16 rolls into a particular store department, where a camera on the cart may recognize a floor graphic or pattern which would permit a handheld device to retrieve and display department information associated with that location.

The special store sensors 46 are constructed and arranged to provide telemetry data to the peripheral device 20, which in turn provide the telemetry data to the mobile computing device 12, for example, which can perform functions such as navigation and so on.

The special store sensors 46 can include active and/or passive sensors. For example, a sensor may be located at a fixed location at the store. Here, for example, an infrared traffic counter may output a radio signal when the cart passes by it. That signal is then captured by a sensor on the cart 16, which in turn is in communication with the mobile computing device 12. These electronic devices may be daisy-chained together to collectively generate a context for customer use.

The watermarking, RFID, or the like represents "passive" data as it is always available to be read by nearby devices and is not "actively" triggered. A store sensor 46 can sense a physical or environmental condition, such as temperature, sound, electromagnetic waves, vibration, pressure, motion, and so on, and provide an environmental input 15 illustrated and described with reference to FIG. 1. For example, a thermostat may transmit data regarding a current temperature to a central controller could also be interpreted by a cart 16, pallet jack, or other vehicle as being associated with certain items or locations. In this way, the cart 16 may 'piggyback' on an existing signal that it could use to identify that it is near the freezer section of the store. In some examples, sensors 46 can detect an identifier transmitted by a transponder fixed to a product. For example, it can be determined whether a particular product has been moved or placed in the shopping cart.

Figure 3:
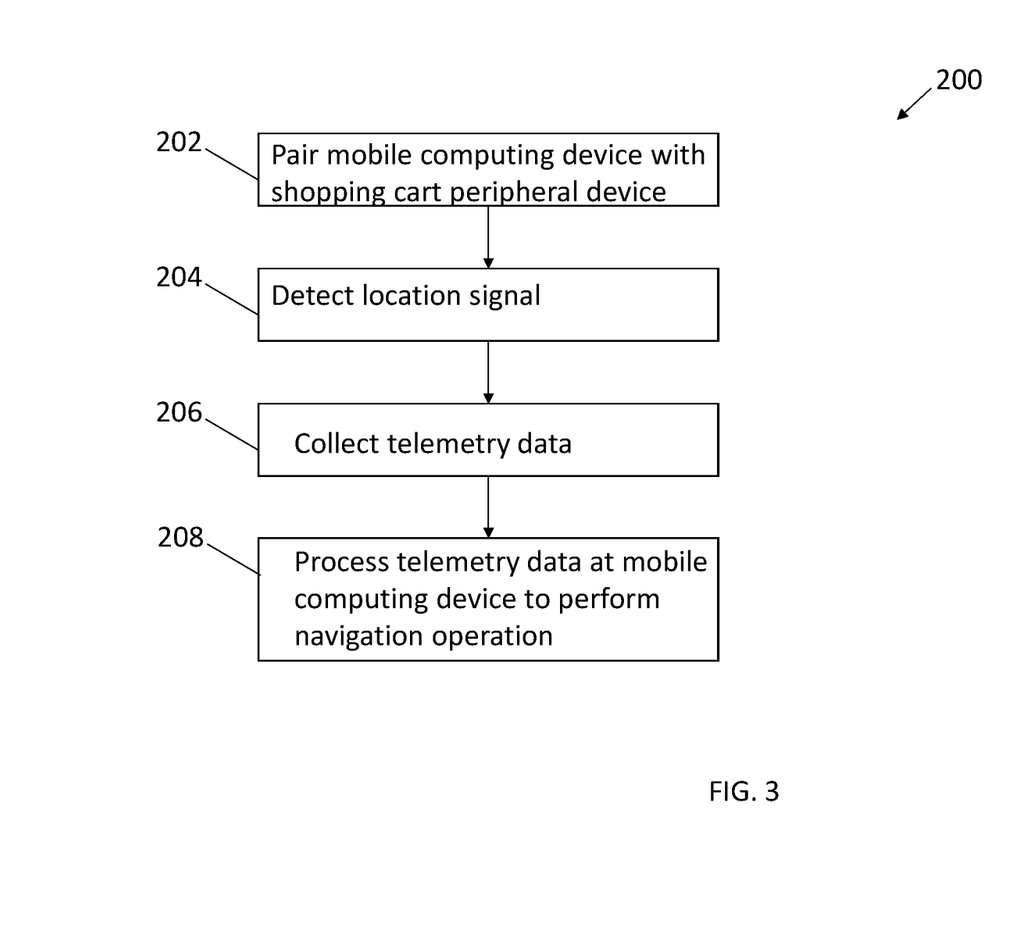
FIG. 3 is a flow diagram of a method for navigation in a store, in accordance with some embodiments.

FIG. 3 is a diagram of a method 200 for navigation in a store, in accordance with some embodiments. In describing the method 200, reference is made to the shopper assistance system shown and described with reference to FIGS. 1 and 2.

At step 202, a user device such as the mobile computing device 12 and shopping cart peripheral device 20 are paired. In some embodiments, the mobile computing device 12 includes an application that allows a user to navigate to locations of interest in a store and/or perform functions requested by a user that are part of the user's shopping experience. The mobile computing device 12 and shopping cart peripheral device 20 may communicate with each other in the pairing using a standard pairing protocol such as Bluetooth protocol. In some embodiments, the peripheral device 20 may process an identifier of the shopping cart 16 or other container to which the peripheral device 20 is associated. This identifier may be read by a camera, a Bluetooth receiver, a NFC reader, RFID reader, or a capacitive touch screen of the mobile computing device 12. The identifier allows the user to receive a signal transmitted by the transmitter of the sensor unit 26 associated with the identifier. For example, the mobile computing device 12 may retrieve a frequency associated with the identifier from a server and tune to that frequency to receive a signal from the sensor unit 26.

At step 204, a location signal is detected. In some embodiments, a location signal may be provided by a VLC light fixture or the like, for example, described in embodiments herein.

At step 206, telemetry data is collected. For example, telemetry from cart 16 to mobile device 12 for use in navigation calculations performed by the device 12.

At step 208, the telemetry data is processed by the mobile computing device 12. For example, a floorplan with locations and contexts may be loaded at and processed by the mobile device application 50. When the application recognizes a certain context, for example, from a blinking LED light, a watermark, or an RFID signal, it would search a data repository for data related to that signal on an index, which in turn may return the coordinates of a location on the map. The map and contexts may be surveyed and constructed beforehand, for example, stored electronically. Then as the cart 16 and mobile device move around, the application can constantly access the map to determine a location.

Performing telemetry processing operations at the mobile computing device 12 instead of a store computer, sensing unit, or the like reduces the processing power and storage capacity requirements for the sensor unit and significantly reduce the cost of making the unit. In some embodiments, the cart requires no on-board data storage, and therefore does not include a storage device. The data processed using the shopping application on the mobile computing device may later be used, for example, to facilitate checkout for the purchase of items, or for other reasons. Also, a shopping cart having minimal hardware permits the shopping cart to function as a peripheral device with respect to a smartphone or other mobile device when performing a navigation operation or the like.

Figure 4:
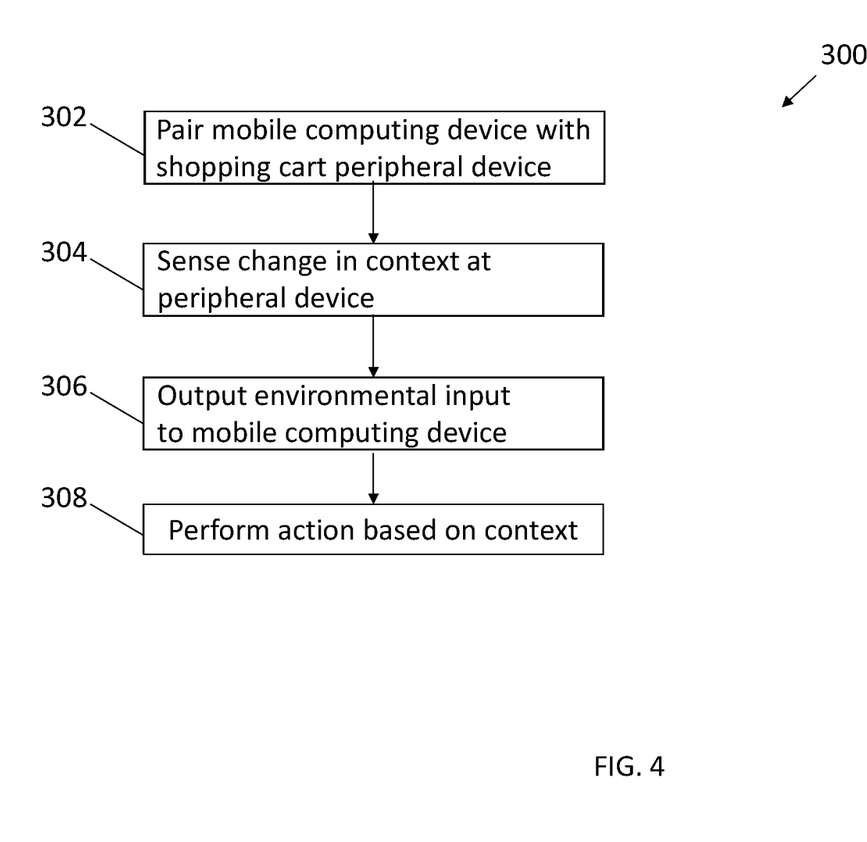
FIG. 4 is a flow diagram of a method for exchanging context-related content at a store, in accordance with some embodiments.

FIG. 4 is a flow diagram of a method 300 for exchanging context-related content at a store, in accordance with some embodiments. In describing the method 300, reference is made to the shopper assistance system shown and described with reference to FIGS. 1 and 2.

At step 302, a user device such as the mobile computing device 12 and shopping cart peripheral device 20 are paired, for example, similar to step 202 of method 200 described with reference to FIG. 3.

At step 304, the shopping cart peripheral device 20 senses a change in context during a user's shopping experience. For example, as the shopping cart 16 moves through different contexts, a sensor of peripheral device 20 can sense a change in context. In some examples, a context can include such conditions as the shopper's current in-store location and movement information, item acquisition or purchase, shopping patterns, and so on.

In some embodiments, a change in context is associated with entering, exiting, or dwelling for a period of time in a location. For example, a change of context may refer to the transition from a sensor unit 26 recognizing an environmental element to not (or vice versa), For example, LED lights may only be located above a checkout counter, so when the customer enters or exits, the customer can create a navigational aid element within the mobile device application 50. The application 50 may recognize that the customer is ready for checkout, or that the customer as completed a checkout process and is exiting the store.

Another example of a change in context may be a change in a signal output from a store transmitter. For example, in the case of inclement weather, the customer can activate a special LED light or other signaling device that directs customers to safe locations. In this example, special lights associated with backup power generators or other alternative emergency systems may be provided. A system here may permit lights to be activated, either manually or automatically. The application 50, via a camera or other sensor, recognizes this, and in response automatically transitions to an emergency navigation state. In doing so, the application 50 may override a previous context. For example, a red LED light may flash in a predetermined manner during a tornado warning. A sensor at the cart may detect this and inform store customers via a mobile electronic device such as a smartphone to navigate to the designated safe location.

Another example of a change in context may be time related. For example, a customer be located at an electronics department of a store. The sensor unit 26 may monitor this location for a duration of time, whereby a "context" may shift from a "shopping list routing" mode to a "browsing" mode when the shopper remains at this location for an amount of time greater than a predetermined time threshold, for example, 5 minutes. Explicitly, the mobile device application 50 may display a different message for the customer, for example, displaying a message "Can I help you find more TV's online?" instead of a predetermined message "proceed to Aisle 1" which would have been displayed had the shopper remained at the electronics department for a shorter amount of time, for example, less than the predetermined time threshold.

At step 306, environmental inputs are provided to the mobile computing device 12. For example, a camera on the shopping cart 16 may via the peripheral device 20 which facilitates an information transfer may collect location information from store signage or other indicators, which may be provided to the mobile computing device 12 which establishes that the shopper is in a checkout lane, a customer service lane, a produce section of the store, and so on.

At step 308, the environmental inputs received at step 306, may be processed by the mobile computing device 12 to configure or prepare itself for actions relevant to the user's shopping experience. For example, marketing events can be determined and provided based on the location information. In doing so, the context data of the environmental inputs is analyzed, and based on the analysis results, electronic coupons or other incentives may be generated and displayed at the mobile computing device 12. In another example, a store associate may stock items at a particular location. The mobile computing device 12 may recognize the location, and in response automatically retrieve inventory, replenishment, and operations management data for that location. Other information may be retrieved such as a non-marketing, customer-facing information, which may include inventory, store operation, or safety information. In another example, a shopping cart configured with a sensor unit 26 may be in a pharmacy, where the mobile device application 50 in communication with the sensor unit 26 may automatically retrieve from a remote database pharmacy tools, prescription status information, and so on.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings herein.

What is claimed is:

1. A sensing device paired with a shopping cart for assisting an operator of the shopping cart, comprising:
    a sensor unit that receives and processes telemetry data received from a context source;
    a processor that reads the telemetry data from the sensor unit; and
    a transmitter that wirelessly transmits the read telemetry data directly from the sensor unit to a mobile computing device, wherein the sensing device operates as a proxy for an application executed by the mobile computing device which lacks a function performed by the sensor unit such that the read telemetry data is processed by the mobile computing device to perform a navigation calculation operation.

2. The sensing device of claim 1, further comprising a power source configured to supply power to at least one of the sensor unit and the transmitter.

3. The sensing device of claim 1, wherein the power source is at least one of a battery, kinetic capacitor, or solar device.

4. The sensing device of claim 1, wherein the sensor unit includes at least one of a visual light context (VLC) processor or a camera.

5. The sensing device of claim 1, wherein the telemetry data includes signal strength information, which is compared to known telemetry, geography, and signal strength levels broadcast in a region of the sensing device.

6. The sensing device of claim 1, wherein the telemetry data is not stored on the sensor unit after transmission.

7. The sensing device of claim 1, wherein the sensing device is integrated with a portion of the shopping cart.

8. The sensing device of claim 1, wherein the sensor unit is detachable from the shopping cart.

9. The sensing device of claim 1, wherein the sensing device is paired with the shopping cart to allow for ergonomic holstering or pocketing of the sensing device while maintaining system functionality.

10. The sensing device of claim 1, wherein the shopping cart is a storage-free shopping cart and the telemetry data is delivered directly from the storage-free shopping cart to the mobile computing device for performing the navigation calculation operation.

11. The sensing device of claim 1, wherein the sensor unit senses a change in context when the sensor unit is moved to different contexts at a store location.

12. The sensing device of claim 1, wherein the sensor unit and the processor provide the proxy for a mobile device application.

13. A shopper assistance system, comprising:
    a mobile computing device application; and
    a peripheral device attached to a shopping cart, the peripheral device comprising:
    a sensor unit that receives and processes one or more environmental input data;
    a processor that reads the environmental input data from the sensor unit; and
    a transmitter that wirelessly transmits the read environmental input data to the mobile computing device application, wherein the sensor unit operates as a proxy for the mobile computing device application executed by a mobile computing device which lacks a function performed by the sensor unit such that the read environmental input data is processed by the mobile computing device application to perform a navigation calculation operation.

14. The shopper assistance system of claim 13, wherein the environmental input data includes telemetry data that is delivered directly from the shopping cart to the mobile computing device application executed by the mobile computing device for performing the navigation calculation operation.

15. The shopper assistance system of claim 13, wherein the sensor unit senses a change in context when the sensor unit is moved to different contexts at a store location.

16. The shopper assistance system of claim 13, wherein the sensor unit and the processor provide the proxy for mobile computing device application.

17. A method of navigation in a store, comprising:
    collecting telemetry data from one or more sensors in the store by a peripheral device attached to a shopping cart; and
    wirelessly transmitting, with a transmitter of the peripheral device, the collected telemetry data to a mobile computing device configured to use the telemetry data to perform a navigation operation, wherein the peripheral device is a proxy for the mobile computing device lacks a function performed by the peripheral device such that the telemetry data is processed by the mobile computing device to perform a navigation calculation operation.

18. The method of claim 17, wherein the telemetry data is delivered directly from the shopping cart to the mobile computing device for performing navigation operations from a processor of the mobile computing device.

19. The method of claim 17, wherein the peripheral device senses a change in context when the shopping cart is moved to different contexts at a store location.

* * * * *